March 16, 1965  J. E. GUINARD  3,173,823
PILED FABRIC AND THE METHOD OF AND APPARATUS
FOR MANUFACTURING THE SAME
Filed June 16, 1961  3 Sheets-Sheet 3

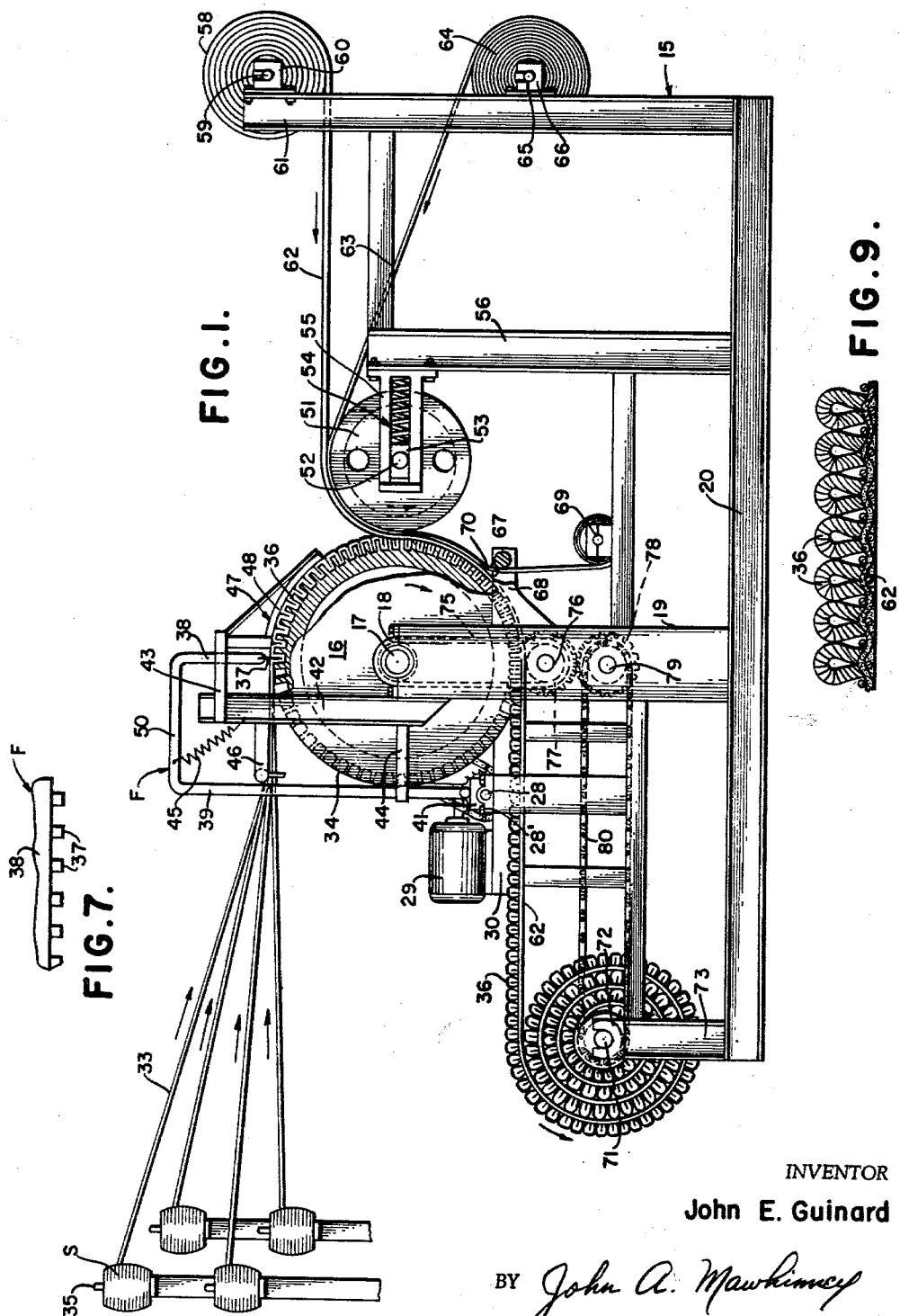

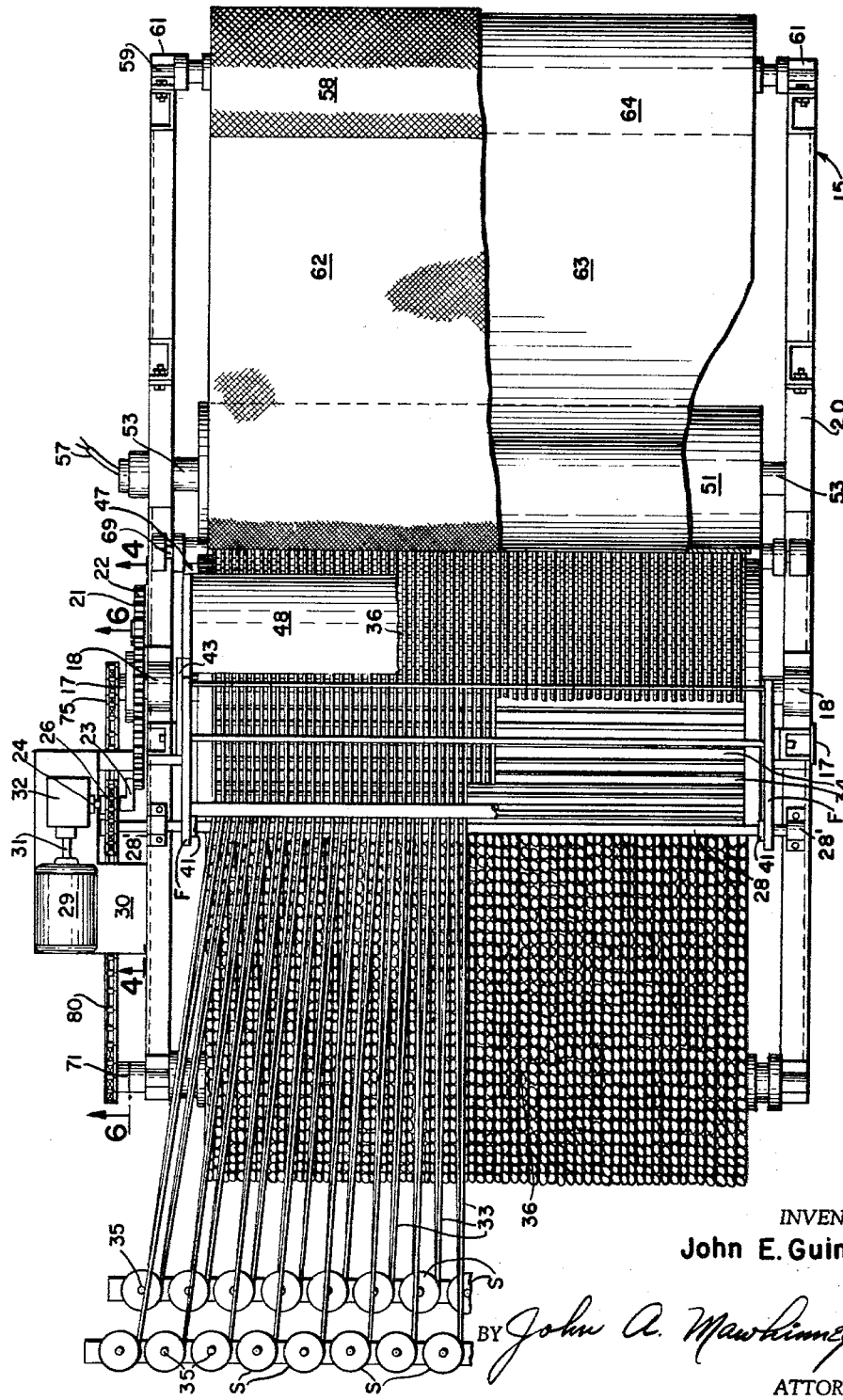

INVENTOR
John E. Guinard
BY John A. Mawhinney
ATTORNEY 3,173,823
PILED FABRIC AND THE METHOD OF AND APPARATUS FOR MANUFACTURING THE SAME
John E. Guinard, 2205 W. 4th St., Apt. 5, Williamsport, Pa.
Filed June 16, 1961, Ser. No. 117,709
11 Claims. (Cl. 156—435)

This invention relates to a piled web or fabric for any appropriate use and for instance as a carpet, rug or the like; to the method of manufacturing such web or fabric; and to apparatus for manufacturing the same.

A prime object is to attain the ends sought without weaving but through heat fusing thermoplastic yarn like nylon which will afford the necessary pile or nap and as well be the medium which welds or attaches it to a fiberglass or equivalent screen functioning as a base and reinforcement for the yarn.

Another important aim is to effect the desired results without severing the yarns into tuft lengths, but rather by continuously implanting or tucking the yarn as a multiplicity of loops into recesses, pockets, holes or equivalent of a support and then by means of heat and pressure applied against adjacent ends of the loops, wholly or partly embedding, welding or fusing together the said loops and fiberglass or equivalent screen material.

Further, it is an object to provide a novel apparatus and procedure wherein is utilized a buffer such as aluminum foil so interposed between the fiberglass screen and heating means as to prevent adherence of fused thermoplastic to the latter.

Another desideratum is to provide novel apparatus to carry out the invention, which may primarily consist either of flat or movable parts, and especially rotatable parts which effect continuous production.

Another object is to provide an apparatus for holding or supporting the yarn in looped tufted condition for heat and pressure fusion to the fiberglass screen in accordance with the invention, and all of which materials may be stripped as a unitary fabric from the holding or supporting apparatus, and in the case of the machine automatically and continuously be so stripped.

Another object is to provide the apparatus as a machine employing a rotatable support having pockets or recesses into which the looped tufts are implanted or tucked, in which position the fiberglass screen is positioned, the fusion takes place, following which the complete pile fabric is progressively stripped from said rotatable support.

Another object is to provide mechanism in the machine to intermittently rotate said rotary means to provide successive short periods of rotation and dwelling, and means timed to operate at such periods of dwell to implant the looped tufts of yarn in the pockets or recesses, and preferably further in association with means which insures maintenance of the looped tufts in the pockets until completion of manufacture of the novel pile fabric.

Another object is to provide such a machine which employs a drum to so intermittently rotate and dwell, in combination with a heat-and-pressure roller means, means to feed a fiberglass fabric against the bases of the looped tufts, and means to interpose a buffer web between the fiberglass screen fabric and said drum.

Another object is to provide a machine having reciprocating means which implants the tufts into the pockets of the drum and a retaining means functions to prevent withdrawal of the looped tufts from the drum until completion of the fabric.

Another object is to provide such a machine as mentioned where the rotation of the drum will operatively draw the yarns from a suitable source, and wherein the completed fabric will be continuously stripped from the drum and coil.

Various additional objects and advantages will become obvious although in part be pointed out in the following description taken in connection with the accompanying drawings illustrating an operative embodiment.

In said drawings:

FIG. 1 is a side elevation of a machine constructed in accordance with the invention;

FIG. 2 is a plan view, partly broken away, to disclose details of the machine shown in FIG. 1;

FIG. 7 is a fragmentary detail view of the tuft-implanting mechanism, particularly disclosing the blades thereof;

FIG. 9 is a fragmentary side edge elevation of the improved fabric.

Figure 4:
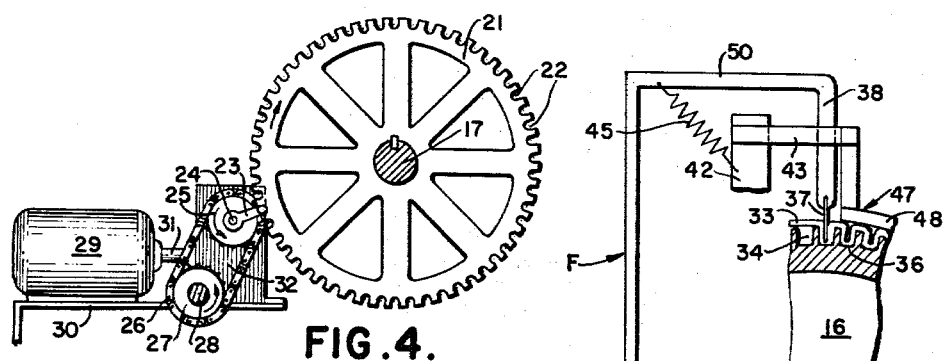
FIG. 4 is a vertical sectional view taken on the line 4—4 of FIG. 2.
Figure 5:
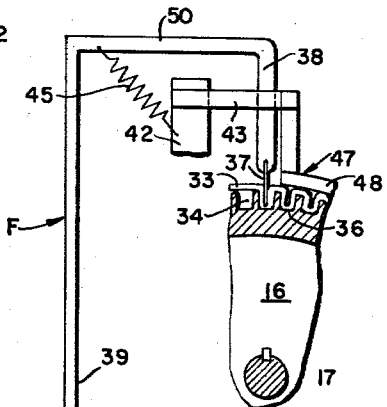
FIG. 5 is a view partly in elevation and partly in section detailing the tuft-implanting mechanism.
Figure 3:
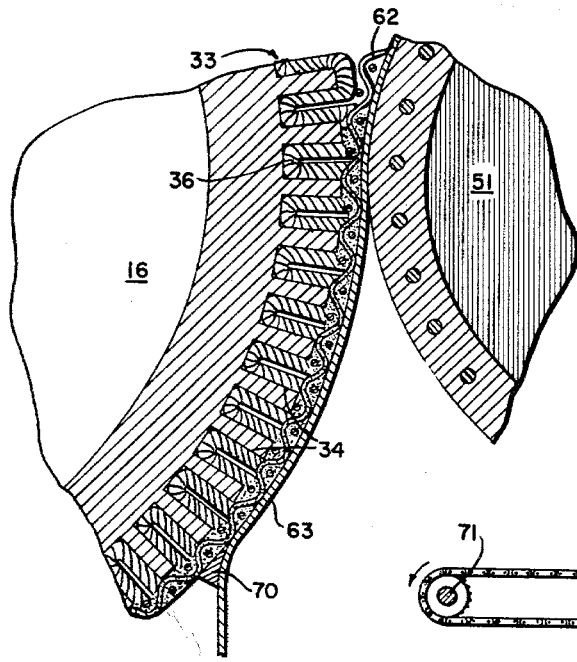
FIG. 3 is an enlarged fragmentary vertical section of portions of the drum and heating roll and fabric of the invention.
Figure 6:
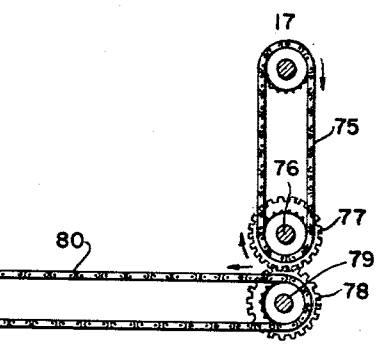
FIG. 6 is a vertical sectional view taken on the line 6—6 of FIG. 2.
Figure 8:
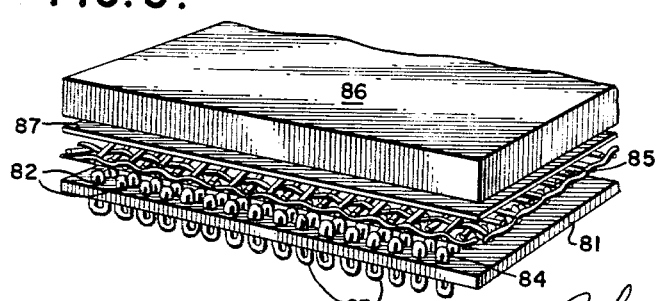
FIG. 8 is a perspective view illustrating a modified form of apparatus for making the fabric.

With more specific reference to the drawings wherein like reference characters designate like or similar parts, the improved pile fabric is shown in FIG. 9 and one form of machine designed to carry out the manufacture of the same appears in FIGS. 1 through 7, and a second means for manufacturing the improved pile fabric is found in FIG. 8.

Reverting to consideration of the machine of said FIGS. 1 through 7, it has a suitable skeleton framework generally designated 15, and approximately centrally of its length is a clockwise rotatable drum 16 mounted upon a main or upper transverse shaft 17 journalled in bearings 18 which are supported for example on posts or standards 19 rising from opposite sides of the base 20 of said framework 15.

Rigid with drum 16, at one end and with the shaft 17 is a wheel 21 (FIGS. 2 and 4) peripherally provided with equidistantly spaced notches 22 and intervening teeth coacting with means whereby a Geneva motion or equivalent is provided through rotation of a crank 23 (FIGS. 2 and 4) movable into and out of the notches 22 in order to intermittently drive the drum 16 and provide an intervening period of dwell between each period of rotation. Any suitable means may be used to accomplish this end. As shown, said crank 23 is rigid with a shaft 24 and with a sprocket wheel 25 over which a sprocket chain 26 is trained and which in turn is trained over and drives a sprocket wheel 27 rigid on a lower transverse shaft 28, journalled in suitable bearings 28' mounted on frame 15. An electric or other motor 29 is mounted as by bracket means 30 on the framework 15 (FIG. 4) to drive a shaft 31 which through an appropriate gear box 32 drives the shaft 24 and parts rigid therewith at the desired speed to intermittently rotate drum 16 as stated.

Reverting to the drum 16, it forms a support for the fabrication of yarns 33 into the novel pile fabric of FIG. 9. To this end, the periphery of the drum or support 16 has multitudinous, peripherally open pockets 34 thereon in spaced relation according to any desired arrangement or pattern, and for instance disposed in parallel or diagonal rows, or in staggered relation. The word "pocket" in the present specification is used in its broadest sense because the pockets described need not be employed in multiplicity in the lines thereof, but each pocket may extend the full length of the drum 18 or, in other words, each pocket may be a groove or channel the full length of the drum to hold in each one or more of the pockets a line or pluralities of the implanted tufts, whereby such examples of the invention provide maximum freedom from the complications encountered in loom weaving.

Said yarns 33 are thermoplastic and usually of "nylon" made in one or any desired number of filaments. Each yarn, as shown in FIGS. 1 and 2 in particular, is pulled through the rotation of drum 16, in the process of manufacture of the fabric from separate suitably mounted spools or supplies thereof at S journalled on suitably supported spindles 35 or the like, which may be mounted on frame 15 or remote thereto, as preferred. Approximately, along a transverse path parallel with and above the axis of shaft 17, each of the yarns 33 is tucked into individual pockets 34 in the form of loops 36, as well shown in FIGS. 1 and 3, this end being accomplished, for example, by a comb of vertically reciprocable tines or fingers 37 (one tine 37 for each yarn), FIG. 7, depending from the short leg 38 of a suitably mounted inverted generally U-shaped frame F having one or more longer legs 39 each carrying a roller 40 at its lower end which rests on a suitable cam or cams 41 keyed on the said transverse shaft 28.

Standard means 42 may rise from posts 19 and mount various upper and lower oppositely extending bracket means 43 and 44 by means of which said legs or depending portions 38 and 39, respectively, are vertically slidably mounted, the frame F being biased downwardly by contractile spring means 45 fastened thereto and to standard means 42 to insure contact of the rollers 40 and cams 41. At 46 (FIG. 1) a guiding comb is used to insure parallel feed of the yarns 33 to drum 16.

It is to be understood that said drum 16 is stationary at its periods of dwell so that the fingers 37 may be reciprocated vertically to move into and out of successive pockets 34 to implant or tuck the tufts 36 into said pockets 34.

Following the implanting or tucking of the last loops into a transverse line of pockets 34, the clockwise rotation of drum 16 moves such implanted or tucked loops under a retainer or guard 47 so that on further rotation of the drum 16 the implanted loops or tufts 34 are prevented from moving out of the associated pockets. This retainer or guard 47, which may assume any suitable form, is shown essentially as an arcuate plate 48 which is slightly offset with respect to the periphery of the drum 16 to the extent necessary to directly maintain the implanted tufts against displacement therefrom and insure retention thereof on the drum until completion of the pile fabric. This plate 48 is mounted in position as from said bracket means 43 and is adjustable in any conventional manner particularly with respect to the drum to accommodate operation with yarns of various sizes and bulk.

It will be seen from FIG. 1 that during manufacture a considerable number of the pockets 34 are occupied by implanted or looped tufts. Adjacent the latter, a heating drum 51 is mounted on a transverse shaft 52 in parallelism to shafts 17 and 28 with its opposite ends journaled in bearing blocks 53 which are slidable horizontally in spaces 54 of mounting brackets 55 extending laterally from uprights or posts 56 rising from the base 20, expansive coil springs disposed in said spaces 54 biasing sliding movement of the heating drum 51 to the left in FIG. 1 in order to press against any material passing between the drums 16 and 51. Such heating drum 51 may be made of any suitable material and construction and heated in any suitable manner, as shown being of the electric type, the feed wires being suggested at 57.

A roll of fiberglass or equivalent fabric which cannot be melted at as low a temperature as "nylon," usually of open mesh screen construction, is shown at 58. This roll is supported on a mandrel 59 in turn detachably supported in bearing means 60 mounted on upright or post means 61. As manufacture progresses, the web 62 of the fiberglass screen of roll 58 is drawn to the left over roll 51, and thence between the same and the drum 16 in direct contact with the adjacent base portions of the looped tufts (see FIG. 3) being heated sufficiently by the roll 51 and pressed by such roll 51 in order to partially or wholly embed the same into the molten plastic of said bases. Usually the temperature at which the roll 51 cements the adjacent bases of the looped tufts is in the neighborhood of 500° F. to 600° F. or even higher but it is always lower than the temperature at which fiberglass or its equivalent will melt. It will be clear that when the joined yarn tufts and fiberglass screen leave the zone of heating that the product cools in the air back to the solid condition in which it is fed or supplied into the machine.

In order to prevent undesired adherence of molten plastic with the periphery of the heater roll 51, an apron or buffer web 63 is adapted to travel at all times between the roll 51 and the fiberglass screen 62. To this end such apron web 62 may be aluminum foil supplied by a roll at 64 on a mandrel 65 removably disposed in brackets 66 mounted on the aforesaid post means 61 below the bearing means 60. The leading end of the apron web 63 (FIG. 1) is guided over roller means 67 carried by a projecting bracket means 68 extending from the post means 19, and thence rewound by any appropriate winding means 69 or otherwise collected or disposed of as desired.

Said bracket 68 may carry a transverse wedge-shaped stripper blade 70 to strip the apron web 63 from the fiberglass screen web 62 at the stage when the bases of the looped tufts 36 and the thermoplastic yarns 33 are fused and the web 62 embedded in the yarns 33. Said apron web 63 having been stripped or peeled from drum 16, the pile fabric is complete (FIGS. 3 and 9) and is wound in any suitable way as suggested at the lower left hand portion of FIG. 1 on a mandrel 71 removably disposed in open top bearing means 72 of support or post means 73 rising from the base 20 of frame 15.

Power to drive mandrel 71 may be taken from shaft 17 (FIGS. 1 and 2) through chain and sprocket means 75 to a transverse shaft 76 and from the latter through intermeshing gear wheels 77 and 78 to a transverse shaft 79 and from the latter through chain and sprocket means 80. Said shafts 76 and 79 are journalled in the standard or upright means 19.

It is to be clear that the invention may be carried out in connection with the nylon yarn and fiberglass screen fiber of any appropriate gauge or size according to the thickness, durability or particular conditions desired for the specific pile fabric to be made.

In operation generally, main drum 16 will draw the nylon yarns 33 from the spools S, and at the periods of dwell permitted by the Geneva or equivalent drive 22–23 for the drum 16, tines or fingers 37 will successively implant or loop portions of the yarns into the pockets 34, and through the continuing intermittent dwells and rotations of the drum 16 such portions will be held by the retainer or guard 47 in said pockets, it being clear that the guard has the various adjustments necessary to enable efficient operation without impairing rotation of said drum 16. In combination with such tufting of the yarns the fiberglass screen fabric 62 and the apron fabric 63 are pulled to the left in FIG. 1 by such drum 16, the same passing intermediate the heating drum 51, which subjects the bases of the implanted loops to a temperature in the neighborhood of 500° to 600° F. or higher, which fuses the bases of the loops 36 causing them to become molten and flow from one side of the fiberglass screen web 62 through the spaces of the fiberglass screen web 62 to the opposite side thereof into contact with the apron web 63 which prevents any molten "nylon" from the bases of the loops 36 from contacting the periphery of the drum 51 and cause the portions of the molten "nylon" which have flowed through the web 62 to spread into a film so that the web 62 becomes embedded in the molten "nylon." Subsequently the buffer web 63 is peeled or stripped by the blade 70 from the fiberglass screen web 62. By this time the atmosphere will have returned the molten plastic "nylon" to its solid state, and the pile fabric is complete and will be wrapped in a coil on the mandrel 71.

It is obvious from the above that the fiberglass screen web 62 is directly embedded in the yarns 33 so that no adhesives are required to weld the yarns 33 to the backing web 62.

In addition to being capable of manufacture in a machine according to the example given, the improved pile fabric of FIG. 9 may be made with the same materials, that is nylon or other thermo-plastic yarns, fiberglass screen web, and the buffer web such as aluminum foil manually, and primarily through the use of flat elements as in FIG. 8. To this end, I may use a flat relatively rigid fiber or metal holder or support 81 of any desired size having appropriate holes, channels, or pockets 82 therethrough according to any approved design. Nylon yarns in looped tufts 83 are implanted by appropriate instruments through the holes or pockets 82, to provide heavy nap projecting beyond one face of the support 81 and base portions 84 of the loops or tufts projecting beyond the other face of the support 81. Sheet fiberglass 85 is then disposed in contact with the base portions 84 and fused in any suitable manner as by a flat heating element 86 subjected to a temperature in the neighborhood of 500° F. or 600° F. or higher, following which the fiberglass 85 is pressed into the fused or molten plastic formed from said bases 84 resulting in a fabric like that disclosed in FIG. 9. To prevent adherence of the molten "nylon" plastic with the heating means 86, a buffer web 87 such as aluminum foil may be arranged between the fiberglass screen web and the heating means 86. Such heating means, for example, may be an electrically or otherwise heated plate or even a flatiron. After the procedure described, it is clear that the heating means and aluminum foil will be removed from the fiberglass and fused base portions 84, whereby the latter rapidly solidify with the fiberglass screen 85 embedded in the "nylon" yarns, without the need for a welding vehicle, such as an adhesive or the like, and constituting the finished pile fabric like that of FIG. 9. It is understood that the finished product is removed from the support 81 to produce the end product as shown in FIG. 9 of the drawing.

Various changes may be resorted to provided they fall within the spirit and scope of the invention.

What is claimed is:

1. An apparatus for making a fabric from fusible yarns comprising a rotatable support having peripheral pockets, means to implant yarns in said pockets in successive tuft-forming U-shaped portions, a heating means coacting with said portions, means to supply a backing between said heating means and said portions to fuse said portions by said heating means to said backing, means to confine fused yarn to the zone of heating in the form of an apron, and means to strip said apron from said backing after fusion of said portions to the backing.

2. An apparatus for making a fabric from fusible yarns comprising a rotatable support having peripheral pockets, means to implant yarns in said pockets in successive tuft-forming U-shaped portions, a heating means coacting with said portions, means to supply a backing between said heating means and said portions to fuse said portions by said heating means to said backing, said heating means comprising a heating drum to fuse said portions, said means supplying screen-like backing over the heating drum and between the same and said rotatable support, and means to supply a fabric between said backing and said heating drum to avoid contact of fused yarn with the heating drum.

3. An apparatus for making a fabric from fusible yarns comprising a rotatable drum having peripheral pockets, means to draw and implant in said pockets U-shaped tuft-forming portions of yarns from a source of the latter upon rotation of the drum, means to supply a backing material against ends of said portions adjacent the periphery of said drum, means to maintain said tuft-forming portions of yarn in said pockets until application of the backing material thereagainst, heating means to fuse said ends of the material of the yarns to said backing, and means to feed an apron between said backing and heating means to protect the latter from contact with molten material.

4. An apparatus for making a fabric from fusible yarns comprising a rotatable drum having peripheral pockets, means to draw and implant in said pockets U-shaped tuft-forming portions of yarns from a source of the latter upon rotation of the drum, means to supply a backing material against ends of said portions adjacent the periphery of said drum, means to maintain said tuft-forming portions of yarn in said pockets until application of the backing material thereagainst, heating means to fuse said ends of the material of the yarns to said backing, and means biasing said heating means toward said drum.

5. Apparatus according to claim 3 having means to strip the apron from said backing after solidification of the fused material.

6. Apparatus according to claim 5 having means to wind the completed fabric into a roll.

7. An apparatus for making a fabric from fusible yarns comprising a rotatable drum having peripheral pockets, means to draw and implant in said pockets U-shaped tuft-forming portions of yarns from a source of the latter upon rotation of the drum, means to supply a backing material against ends of said portions adjacent the periphery of said drum, means to maintain said tuft-forming portions of yarn in said pockets until application of the backing material thereagainst, heating means to fuse said ends of the material of the yarns to said backing, said means to maintain said tuft-forming portions of yarn in said pockets being approximately arcuate and disposed about and relatively close to the periphery of the drum.

8. An apparatus for making a fabric from fusible yarns comprising a rotatable drum having peripheral pockets, means to draw and implant in said pockets U-shaped tuft-forming portions of yarns from a source of the latter upon rotation of the drum, means to supply a backing material against ends of said portions adjacent the periphery of said drum, means to maintain said tuft-forming portions of yarn in said pockets until application of the backing material thereagainst, heating means to fuse said ends of the material of the yarns to said backing, said means to implant having reciprocating movement in a path substantially radially with respect to the said drum.

9. Apparatus according to claim 8 including power means to intermittently drive said drum and impart said reciprocating movement to said implanting means.

10. An apparatus for making a fabric from fusible yarns comprising a rotatable drum having peripheral pockets, means to draw and implant in said pockets U-shaped tuft-forming portions of yarns from a source of the latter upon rotation of the drum, means to supply a backing material against ends of said portions adjacent the periphery of said drum, means to maintain said tuft-forming portions of yarn in said pockets until application of the backing material thereagainst, heating means to fuse said ends of the material of the yarns to said backing, said implanting means being biased toward the axis of said drum and being generally an inverted U-shaped frame with one leg thereof longer than the other leg, and implanting tines carried by the latter leg and said power means including a cam assembly to operate said frame.

11. Apparatus according to claim 10 including mounting means common to said means to maintain said tuft forming portions in said pockets and to said frame.

References Cited by the Examiner

UNITED STATES PATENTS

| | | | |
|---|---|---|---|
| 2,639,250 | 5/53 | Reinhardt | 154—49.29 |
| 2,738,296 | 3/56 | Runton et al. | 154—49.29 |
| 2,809,909 | 10/57 | Chatanay | 156—72 |
| 2,896,304 | 7/59 | Peroni | 154—49.29 |
| 2,901,005 | 8/59 | Schwartz | 154—49.29 |
| 3,000,772 | 9/61 | Lunn. | |
| 3,034,942 | 5/62 | Heiks | 161—66 |
| 3,075,867 | 1/63 | Cochran | 161—66 X |
| 3,142,604 | 7/64 | Mills et al. | 161—66 X |
| 3,142,611 | 7/64 | Mills | 156—72 X |

ALEXANDER WYMAN, *Primary Examiner.*

HAROLD ANSHER, EARL M. BERGERT, *Examiners.*